United States Patent
Babej et al.

(10) Patent No.: US 8,602,704 B2
(45) Date of Patent: Dec. 10, 2013

(54) ELEMENT ATTACHABLE BY RIVETING TO A SHEET METAL PART AND ALSO A COMPONENT ASSEMBLY AND A METHOD FOR THE PRODUCTION OF THE COMPONENT ASSEMBLY

(75) Inventors: Jiri Babej, Lich (DE); Michael Vieth, Bad Vilbel (DE); Richard Humpert, Bad Nauheim (DE)

(73) Assignee: Profil Verbindungstechnik GmbH & Co. KG, Friedrichsdorf (DE)

( * ) Notice: Subject to any disclaimer, the term of this patent is extended or adjusted under 35 U.S.C. 154(b) by 47 days.

(21) Appl. No.: 13/399,142

(22) Filed: Feb. 17, 2012

(65) Prior Publication Data
US 2012/0148367 A1   Jun. 14, 2012

Related U.S. Application Data

(62) Division of application No. 12/876,101, filed on Sep. 3, 2010, now Pat. No. 8,141,229, and a division of application No. 11/303,766, filed on Dec. 16, 2005, now Pat. No. 7,815,406.

(30) Foreign Application Priority Data

Dec. 23, 2004   (DE) .................. 10 2004 062 391

(51) Int. Cl.
*F16B 19/04* (2006.01)
*B21J 15/02* (2006.01)

(52) U.S. Cl.
USPC ....................................... 411/181; 29/525.06

(58) Field of Classification Search
USPC ........... 29/525.06, 432.1, 432.2, 431, 502.06, 29/428, 505; 411/181, 188, 107, 179, 183
See application file for complete search history.

(56) References Cited

U.S. PATENT DOCUMENTS

| 1,502,399 A | 7/1924 | Renner |
| 3,253,631 A | 5/1966 | Reusser |

(Continued)

FOREIGN PATENT DOCUMENTS

| DE | 34 47 006 A1 | 7/1985 |
| DE | 102 49 030 A1 | 11/2003 |
| EP | 0 539 793 B1 | 12/1996 |
| EP | 1178162 B1 | 4/2003 |

(Continued)

OTHER PUBLICATIONS

English language translation of the abstract of DE 102 49 030 A1.
English language abstract of JP 4249609.

*Primary Examiner* — John C Hong
(74) *Attorney, Agent, or Firm* — Hershkovitz & Associates PLLC; Abraham Hershkovitz; Eugene C. Rzucidlo

(57) ABSTRACT

An element attachable to a sheet metal part by riveting, having a shaft part and a head part. The head part has at its side con-fronting the sheet metal part a ring recess which merges at the radially inner side into a cylinder section of the head part which merges into the shaft part and into a tubular rivet section which surrounds the shaft part in the region of the head part. The head part is disposed within a contact surface arranged radially outside of the ring recess and merges at the radially outer side via an at least approximately conical wall into the ring-like contact surface. At least one local recess and preferably a plurality of in particular uniformly distributed local recesses is or are provided in the conical wall of the ring recess and/or in an optionally present base surface of the ring recess.

6 Claims, 10 Drawing Sheets

(56) References Cited

U.S. PATENT DOCUMENTS

| | | |
|---|---|---|
| 4,310,272 A | 1/1982 | Rich et al. |
| 5,251,370 A | 10/1993 | Muller et al. |
| 7,815,406 B2 * | 10/2010 | Babej et al. ............... 411/181 |
| 8,141,229 B2 * | 3/2012 | Babej et al. ............ 29/525.06 |

FOREIGN PATENT DOCUMENTS

| | | |
|---|---|---|
| JP | 2741424 B2 | 1/1998 |
| JP | 2002122113 | 4/2002 |
| WO | WO 00/26546 | 5/2000 |
| WO | WO 02/007468 A1 | 10/2002 |

* cited by examiner

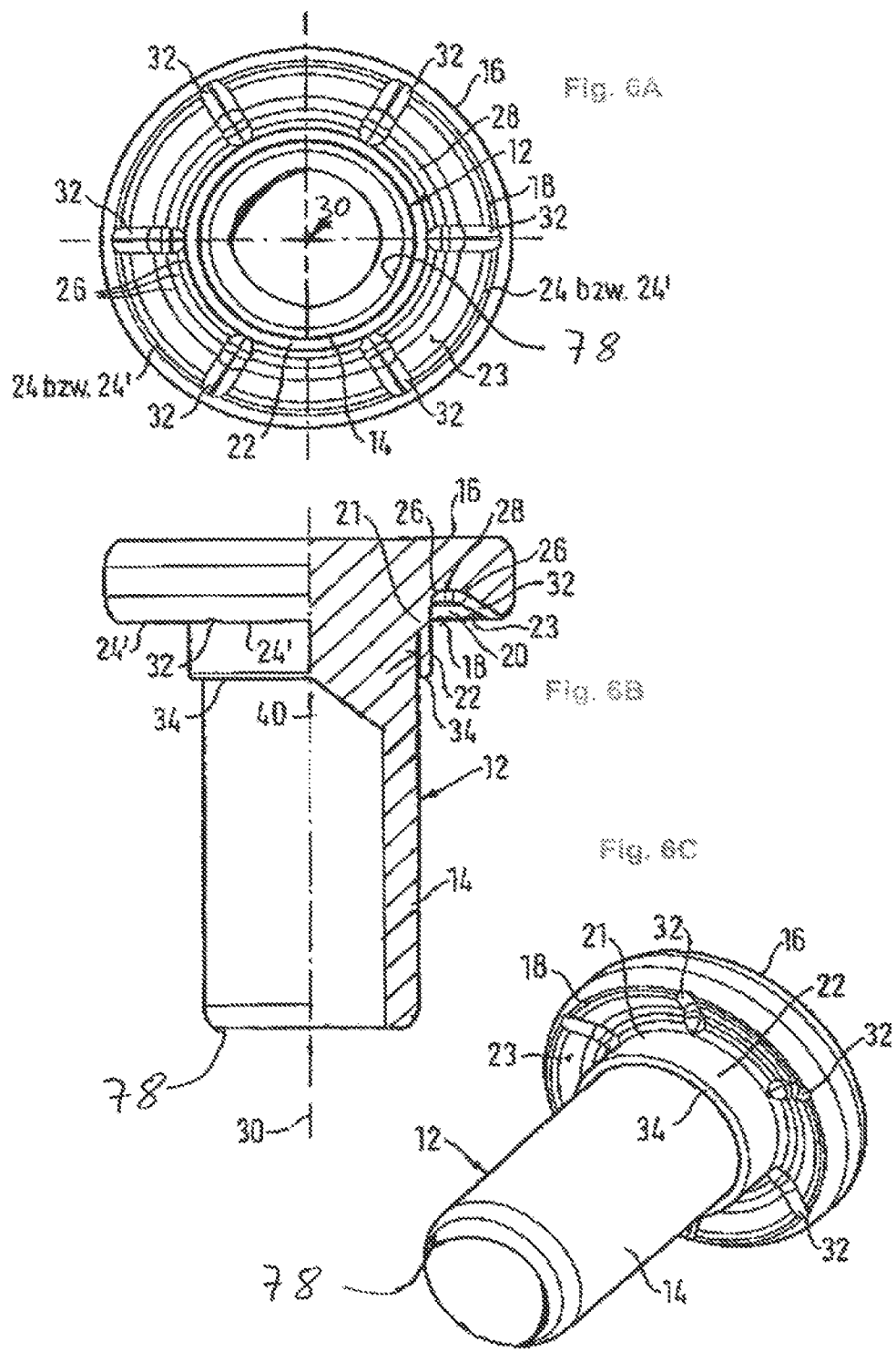

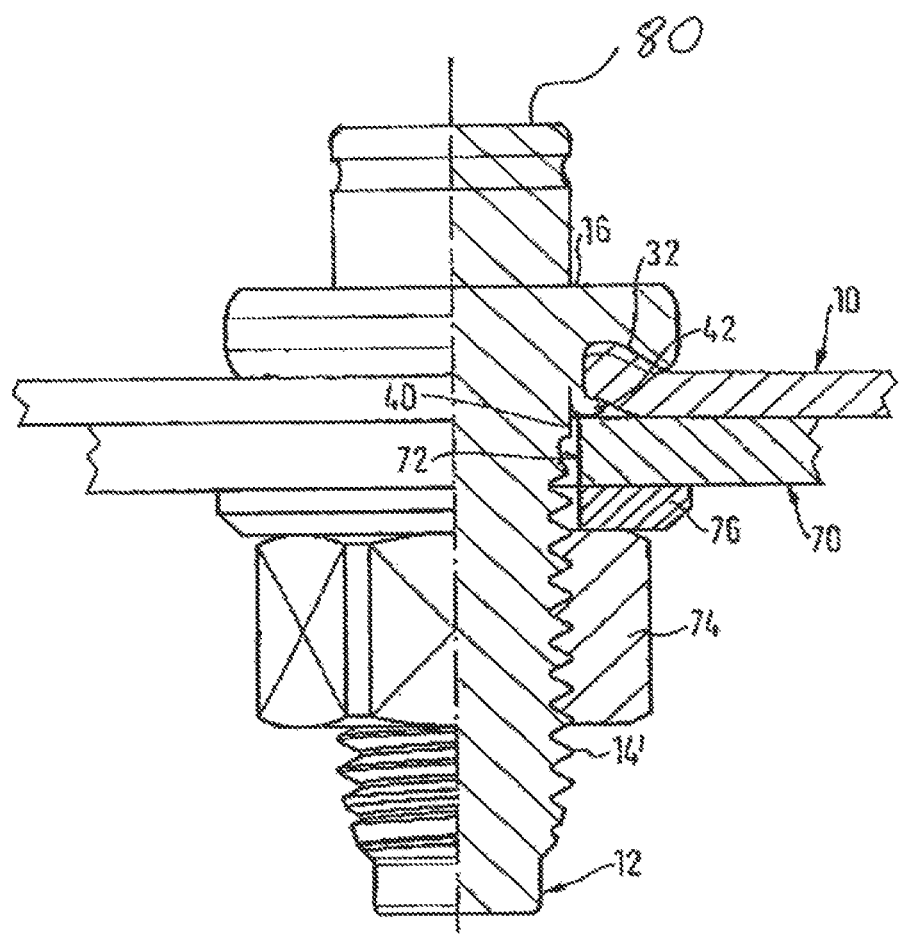

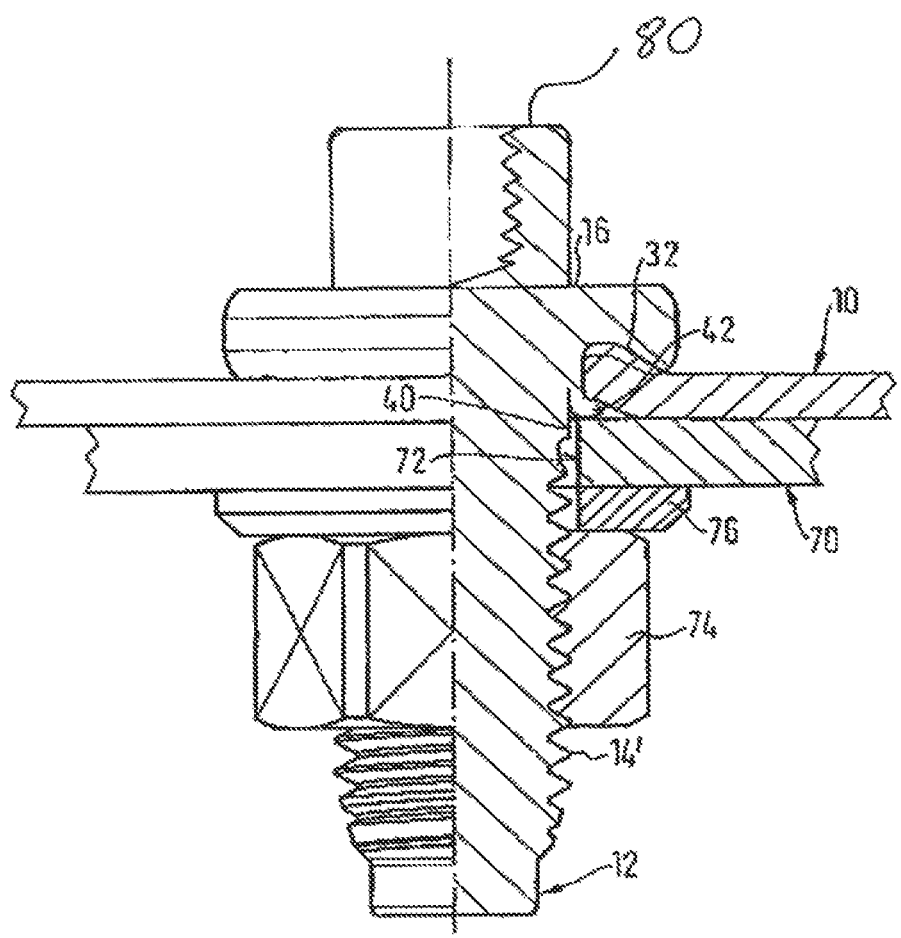

ELEMENT ATTACHABLE BY RIVETING TO A SHEET METAL PART AND ALSO A COMPONENT ASSEMBLY AND A METHOD FOR THE PRODUCTION OF THE COMPONENT ASSEMBLY

CROSS-REFERENCE TO RELATED APPLICATION

This application is a division of 12/876,101, filed Sep. 3, 20101, pending, which is a divisional of 11/303,766, filed Dec. 16, 2005, issued as U.S. Pat. No. 7,815,406, which claims priority of German Patent Application No. 10 2004 062 391.0 filed Dec. 23, 2004, the disclosures of which are expressly incorporated by reference herein in their entireties.

FIELD OF THE INVENTION

The present invention relates to an element attachable to a sheet metal part by riveting, in particular an element in the form of a centering bolt, having a shaft part and a head part, wherein the head part has at its side confronting the sheet metal part an at least approximately ring-like ring recess, which merges at the radially inner side into a cylinder section of the head part which in turn merges into the shaft part and into a tubular rivet section which surrounds the shaft part in the region of the head part, is disposed within a ring-like contact surface arranged radially outside of the ring recess and merges at the radially outer side via an at least approximately conical wall into the ring-like contact surface. Furthermore, the invention relates to a component assembly comprising a sheet metal part to which the element is attached and also a method for the attachment of the element to a sheet metal part.

An element, a component assembly and also a method of the initially named kind are known from FIGS. 8 and 9 of EP-A-0 539 793. In the method described there the sheet metal part is so designed that it has a conical raised portion in the region of the attachment, with the shaft part of the bolt provided with the thread and also the ring-like rivet section being introduced through a central opening of the conical raised portion coming from the raised side, with the upper region of the conical raised portion being pressed flat during the riveting process and with the rivet bead coming to lie within a ring recess at the underside of the sheet metal part, i.e. at the side of the sheet metal part remote from the head part of the bolt element, with the ring recess still being present even after the partial pressing flat of the conical raised portion.

In the illustrated embodiment a plurality of noses providing security against rotation are pre-sent which are distributed uniformly in the peripheral direction, which are present in the region of the transition of the ring recess of the head part into the ring-like rivet section and which have a triangular shape in side view, with the noses providing security against rotation extending in the radial zone only over a part of the width of the ring recess.

Bolt elements of this kind have, however, not been used in practice. One reason for this is that the noses providing security against rotation on the one hand tend, if anything, to hinder the desired reshaping of a sheet metal part and, on the other hand, stiffen the ring-like rivet section whereby the beading over of the beading section proves difficult. Furthermore a design of this kind can lead to undesired deformations of the sheet metal. In this type of element the die button which is responsible for the formation of the rivet bead and for the re-shaping of the sheet metal part presses against the rivet bead and the rivet bead presses against the sheet metal part. Accordingly the rivet bead which is being formed has to press the sheet metal part against the noses providing security against rotation and press the noses providing security against rotation into the sheet material. This proves difficult in practice and it can transpire that the sheet material is caught up at the noses providing security against rotation whereby the formation of the rivet bead fails and the rivet section is deformed and centrally pressed quasi radially into the sheet material.

A series of applications are known in technology in which an element attached to a sheet metal part by riveting is to serve as a centering element. In this connection the element has a part zone of the shaft which fits relatively tightly within a hole of a further component which is attached to the element riveted to the sheet metal part and which is to be accurately positioned relative to the sheet metal part. In this connection the centering element can have a purely centering function, with the screwing on of the further component to the sheet metal part being effected by other elements, or the centering element can simultaneously be provided with a thread which serves for the attachment of the further component to the sheet metal part. The element then has not only a centering function but also an attachment function.

Such centering elements or centering and fastener elements have hitherto been realized by the component Profil Verbindungstechnik GmbH & Co. KG in the form of so-called SBF bolts which are for example described in German patent 3447006.9. In an SBF bolt element the end of the head part remote from the shaft part is designed for a rivet connection with the sheet metal part.

Although such centering elements, optionally with a fastening function, have proved them-selves in practice, the attachment to the sheet metal part in the region of the head part of the element requires a relatively large re-shaping of the sheet metal part and of the head part. This leads to a situation in which, for elements with a shaft diameter of 12 mm or more, relatively large re-shaping forces are required in order to achieve the required rivet connection to the sheet metal part. This is in particular problematic when the sheet metal part has a considerable thickness which is frequently the case when using centering elements with a larger shaft diameter.

A similar problem arises also with other fastener elements which can be used for centering purposes.

A further element which can be used as a centering element is described in WO 02/077468. This is a functional element with a head part having a ring-like contact surface and a tubular rivet section standing away from the head part at the side of the contact surface of the head part, with a tubular guide section being disposed concentrically to the tubular rivet section and radially within the latter, with a ring gap being provided between the guide section and the rivet section and with the guide section projecting beyond the free end of the rivet section.

The free end of the wall of the tubular rivet section is rounded both at the radially outer side and also at the radially inner side when seen in an axial section plan and has for example a semicircular shape or a shape resembling an arrow tip which is helpful for the formation of the rivet bead. The guide section is formed as a piercing section and has, at its end remote from the contact surface, a ring-like cutting edge so that the element can be introduced in self piercing form into a sheet metal part. The element is formed as a nut element which first makes the self-piercing function possible. In this element no ring recess is however provided in the ring-like contact surface and the noses providing security against rotation have the shape of raised portions or ribs which extend in the radial direction and which are formed at the ring-like contact surface.

SUMMARY OF THE INVENTION

The object of the present invention is to provide an element of the initially named kind which can have a purely centering function as well as a centering and attachment function, with forces being required for the attachment to the sheet metal part which remain within accept-able limits even with shaft diameters of 12 mm and larger, with undesired deformation of the sheet metal part not having to be feared and with it being possible to use only one element with sheet metal parts of various thicknesses with an excellent resistance to rotation being achieved.

In order to satisfy this object an element of the initially named kind is provided which is characterized in that at least one local recess and preferably a plurality of in particular uniformly distributed local recesses is or are provided in the conical wall of the ring recess and/or in an optionally present ring-like base surface of the ring recess.

Through the provision of features providing security against rotation in the form of a local recess or a plurality of uniformly distributed recesses in the conical wall of the ring recess and/or in a tubular base surface of the ring recess a situation is prevented, in particular with thicker metal sheets, that the features providing security against rotation represent a resistance during the attachment of the element to the sheet metal part which has first to be overcome for the shaping of the sheet metal part or for the reshaping of the rivet section. Furthermore, such recesses providing security against rotation lead to a situation in which no undesired deformation of the sheet metal part arises which is of particular significance for a centering element. Moreover, such recesses providing security against rotation ensure an adequate rotational security and do not prevent the rivet bead being formed such that it can be fully received within a ring recess present at the lower side of the sheet metal part, i.e. at the side of the sheet metal part remote from the head part of the element, so that a flat attachment surface is present at the lower side of the sheet metal part. This in turn gives the guarantee that the guide section of the element which brings about the centering can also be provided directly at the underside of the sheet metal part, i.e. at the free end face of the rivet bead which is present at the shaft part of the element so that an ideal centering or positioning of a component is ensured which is disposed over the guide section of the element.

Furthermore, the element in accordance with the invention can be used in one embodiment with different sheet metal thicknesses in a relatively wide range. For example only two different elements are required to cover a range of sheet metal thicknesses from for example 0.6 to beyond 3.5 mm without the rivet bead which is positioned in the ring recess at the lower side of the sheet metal part projecting beyond the lower side of the sheet metal part and causing in difficulties during the attachment of the further component. For example, in a first embodiment with a short rivet section, sheet metal thickness of 0.6 to 1.5 mm can be covered while a second embodiment with a longer rivet section can be used for sheet metal thicknesses from for example 1.5 to over 3.5 mm. In particular one succeeds in using one element with a somewhat shorter rivet section for sheet metal thicknesses in the range 1.25 to over 3.0 mm and this represents a range which very frequently arises for centering bolts. It should also be stated that the invention is in no way restricted to elements with a shaft diameter of approximately 12 mm, but rather the shaft diameter used can be selected in a broad range, for example—without restriction—in the range from 4 mm to 38 mm.

The element in accordance with the invention also has the advantage that it is possible to carry out the so-called clamping hole riveting process in accordance with the European patent 0 539 793 B1 and to hereby achieve the desired stranglehold between the sheet metal part and the element. In other words the (partial) pressing flat of the conical raised portion can be exploited in order to reduce size of the central opening of a sheet metal part during the carrying out of the riveting process, so that the rim region of the opening enters into contact with the sheet metal of the element in the region above the rivet section or in the region of the rivet section while the latter is turned over radially outwardly through the riveting process and optionally radially expanded by the riveting process.

It is, however, not essential to use the clamping hole riveting process but rather the shape of the conical raised portion can be matched to the shape of the ring recess in the underside of the head part of the element since, during the beading over of the rivet section, the die button can so crush the sheet metal material between itself and the head part of the element that the sheet metal material not only flows into the local recess or recesses but rather also is urged radially inwardly, where by the stranglehold which is aimed at can likewise be achieved.

Even when the fastener element has a pure centering function it is favorable to provide the features providing security against rotation into the form of the local recess or recesses, since one can in this way provide a simple possibility of ensuring that the method for the attachment of the element to a sheet metal part takes place with the required process reliability. One can namely, after attachment of the element of the sheet metal part and with appropriate support of the sheet metal part apply torques to the element in an attempt to twist the element out of the sheet metal part or to loosen it in the sheet metal part. The level of the torque which arises is a measure as to how firmly the element is attached to the sheet metal part and can be used to ensure quality or to check quality.

With an element having a fastening function the features providing security against rotation are in any event necessary in order to ensure that the attachment function can be achieved, i.e. to produce the required security against rotation during the attachment of a nut to the shaft part of an element realizes a bolt element or during the screwing of a screw into a hollow shaft part of an element formed as a nut element. When forming the element as a nut element the thread can be provided in the head part, in the hollow shaft part and/or in an attachment section which is provided at the side of the head part remote from the shaft part. In the latter case the attachment section preferably has a smaller outer diameter than the head part of the element, whereby a ring-like contact pressure surface can be provided which enables the pressing of the element into the sheet metal part and the carrying out of the riveting process without the fastener section being deformed by the forces which arise. In the event of realization of the element as a nut element it could also be made self-piercing.

The component assembly in accordance with the invention is characterized in that the sheet metal part has a ring-like raised formation in the region of the ring recess which is received in the ring recess; in that material of the sheet metal part is disposed in the or in each local recess and in that the sheet metal part has, at the side remote from the ring recess, a ring recess into which the rivet section which has been turned over into a rivet bead is disposed, with the side of the rivet bead remote from the head part at least substantially not projecting beyond the side of the sheet metal part in the region around the rivet bead and preferably being set back slightly relative to the latter.

Finally, the method of the invention for the attachment of an element to a sheet metal part for the formation of a component assembly is characterized in that the element is inserted into a pre-holed sheet metal part which is preferably pre-shaped in the region of the hole to form a raised portion which is matched at least substantially to the shape of the ring recess or preferably has a steeper conical shape than the conical wall; in that the sheet metal material around the rivet section is formed by means of a die button having a central recess or a central bore which receives the shaft part and a ring-like raised portion which surrounds the central section or the bore, into the or each local recess and the rivet section is laid or pressed into the ring recess formed in the underside of the sheet metal part during formation of the rivet bead.

In this embodiment the ring-like raised portion of the die button is formed at its free end at least substantially with a ring edge which merges into a rounded shaping surface disposed radially outside of the ring edge, whereby the rivet section is re-shaped into a rivet bead. In this connection the ring edge has a diameter which is smaller than that of the tubular rivet section in the region of the ring apex of the free end of the rivet section, so that the ring edge can deflect the rivet bead radially outwardly during the riveting process.

BRIEF DESCRIPTION OF THE SEVERAL VIEWS OF THE DRAWING

The invention will be explained in more detail in the following with reference to the drawings in which.

DETAILED DESCRIPTION

Figure 1C:
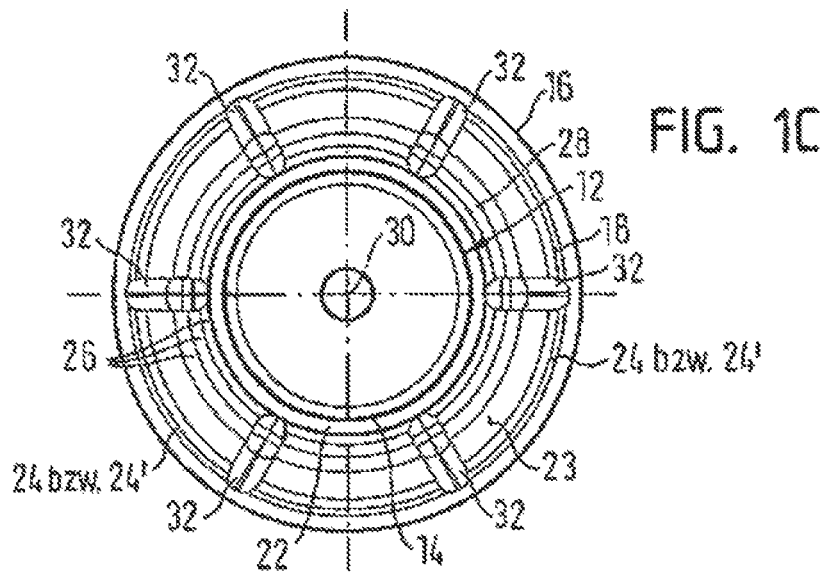
FIGS. 1A-C show three views of an element in accordance with the invention with a pure centering function, with FIG. 1A showing the element in a perspective illustration at the underside of the head part, FIG. 1B being an illustration of the element in FIG. 1A sectioned partly in longitudinal direction, and FIG. 1C showing a plan view of the underside of the head part of the element in accordance with FIGS. 1A and 1B, FIGS. 2A-B show the attachment of the element of the invention in accordance with FIGS. 1A-1C to a sheet metal part, with FIG. 2A showing the state prior to the introduction of the element through the central opening of a conical raised portion and FIG. 2B showing the component assembly in a partly sectioned representation, FIGS. 3A-C correspond to FIGS. 1A-1C but show a modified embodiment in the form of a centering element with a fastening function, FIGS. 4A-B correspond to FIGS. 2A-2B but show the attachment of the bolt element of FIGS. 3A-3C to a sheet metal part.

Referring to FIGS. 1A to 1C and FIGS. 2A to 2B an element 12 is shown which is attached to a sheet metal part 10 by riveting. The element 12 has the form of a centering element having a shaft part 14 and a head part 16, with the head part having an at least approximately ring-like recess 20 at its side 18 remote from the sheet metal part 10 with the ring recess merging at the radially inner side into a cylindrical section 21 of the head part 16 which in turn merges into the shaft part 14 and a tubular rivet section 22 which surrounds the shaft part 14 in the region of the head part 16, i.e. directly beneath the head part 16. The ring recess 20 is arranged within a ring-like contact surface 24 disposed radially outside of the ring recess, or radially outside of a contact surface consisting of circular ring segments 24', and merges at the radially outer side via an at least approximately conical wall 23 into the contact surface 24 or 24'. The conical wall 23 can advantageously have an included cone angle as shown of approximately 33° relative to a horizontal plane, with this angle being able to be selected straightforwardly in the range from 20° to 45° and these values should also not be considered restrictive.

Radially within the conical wall the ring recess 20 has in this embodiment a curved ring-like base surface 26 at least in half-cross section which merges into the radially outer surface 28 of the cylinder section 21. In this example the base surface 26, which is curved in radial half cross section, includes a flat section 28 which stands substantially perpendicular to the central longitudinal axis 30 of the element 12. It would however be conceivable to omit the flat base surface or to expand the radial width of the flat section 28 so that it merges directly or via a relatively small radius into the conical wall 23 and/or into the cylindrical section 21 above the rivet section 22 (not shown). The base surface could also be realized differently, i.e. by a relative sharp transition of the conical wall into the cylindrical section 21 above the rivet section 22 (with the term "above" being understood for the shown orientation of the element 12 and not as a geometrical definition).

At least one local recess 32 and preferably a plurality of in particular uniformly distributed local recesses 32 is or are provided in the conical wall 23 of the ring recess 20 and/or in the optionally provided base surface 26 of the ring recess 20.

The or each local recess 32 has an elongate rounded shape, with the transition from the side walls of each local recess merging in this embodiment via a sharp edge into the surface of the ring recess 20. These transitions could however also be made rounded.

Figure 1B:
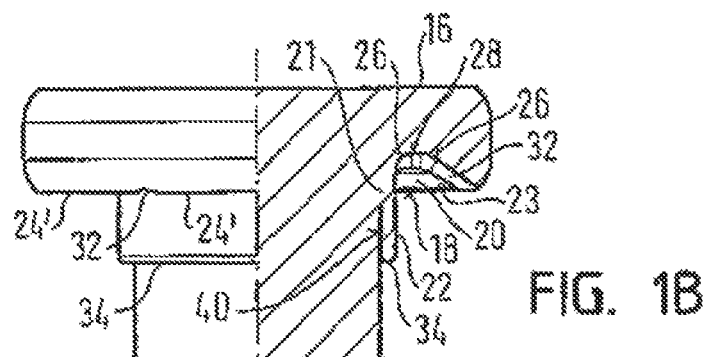

The or each local recess 32 is essentially arranged in a radial plane and is made so long in this embodiment that it extends into the ring-like contact surface, whereby the ring-like contact surface 24 is subdivided into circular ring segments 24', as can in particular be recognized at the points 24', 32', 24 at the left hand side of FIG. 1B. The designation "ring-like contact surface" is thus to be understood in such a way that it also covers a contact surface composed of circular ring segments which is interrupted by such local recesses. It is, however, also possible to make the local recesses shorter so that they do not reach the contact surface 24 and do not subdivide it.

In precisely the same way as the local recesses subdivide the ring-like contact surface 24 in this example they also subdivide the base surface 26 of the ring recess 23. When this base surface 26 is termed ring-like then this is to be understood in such a way that this also includes a base surface which is interrupted by one local recess or by a plurality of local recesses.

In this example six uniformly distributed local recesses are provided. However, a different number of recesses can also be straightforwardly provided—from one local recess up to twelve local recesses would be completely conceivable—and a larger number could also be considered, above all if they are made smaller or narrower and less deep.

As can be seen from the drawing, in particular from FIG. 1B the free end 34 of the wall of the tubular rivet section is rounded when seen in a radial section plane (as shown at the right hand side in FIG. 1B) both at the radially outer side and also at the radially inner side and has, for example, a semi-circular shape or a shape resembling an arrow tip, whereby a ring apex at the lower end of the rivet section arises precisely at the position designated by 34.

In the embodiment of FIGS. 1A-1C and 2A, 2B, the shaft part 14 is formed as a solid or tubular centering part. Instead of forming the element as a pure centering element it can also be formed as a centering and attachment element in accordance with FIGS. 3A to 3C and FIGS. 4A and 4B respectively.

In the description of the embodiment of FIGS. 3A to 3C and FIGS. 4A and 4B features which have the same shape and/or the same function as in the embodiment of FIGS. 1A to 1C and FIGS. 2A and 2B are provided with the same reference numerals and it will be understood that the same description also applies for the corresponding features or function unless something is stated to the contrary. It also applies inversely, i.e. the description of FIGS. 3A to 3C and of FIGS. 4A and 4B also applies to the embodiment of FIGS. 1A to 1C and FIGS. 2A and 2B unless something is stated to the contrary. For the sake of brevity the description will thus not be un-necessarily repeated. In the embodiment of FIGS. 3A to 3C and FIGS. 4A and 4B the shaft part 14 is provided with a thread 14'.

Figure 4A:
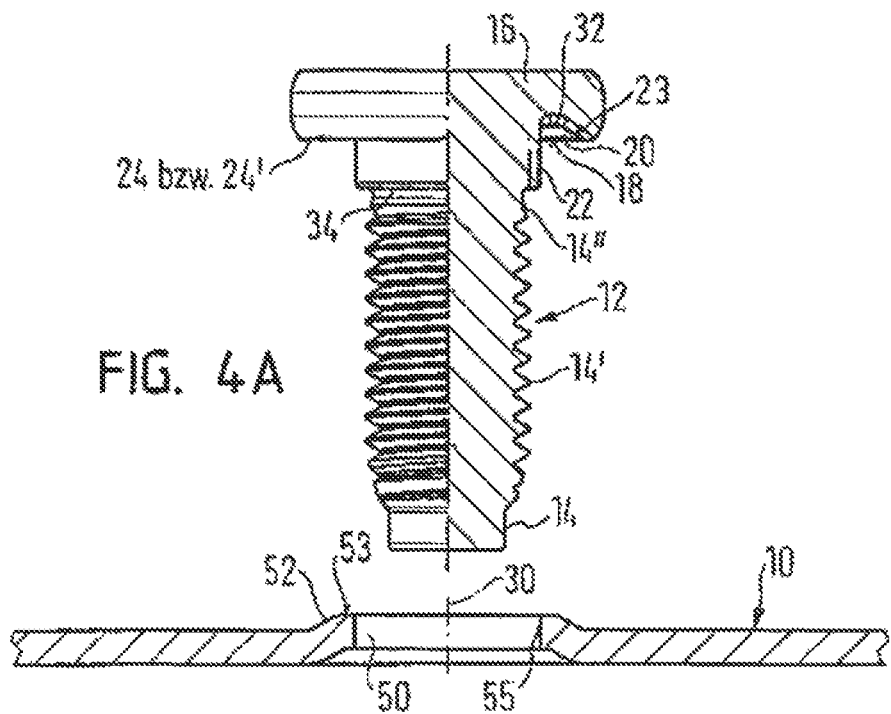
Figure 4B:
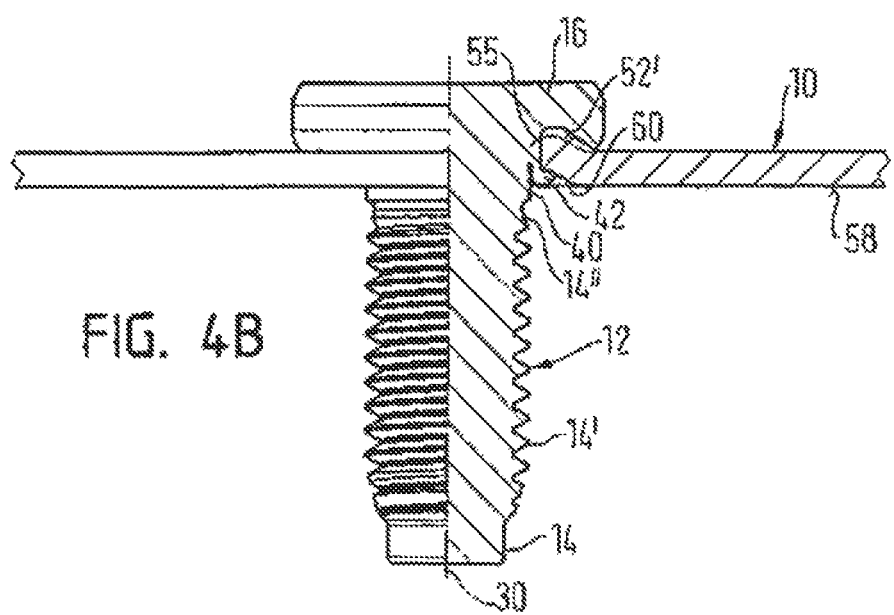

The thread 14' has a thread run-out 14" adjacent the region of the free end of the tubular rivet section and the thread run-out merges into a cylindrical section 40 with a diameter which is of the same size as or larger than the outer diameter of the thread. This cylindrical section 40, which forms the actual centering section, essentially first comes to light when the element 12 is attached to the sheet metal part 10, as shown in FIG. 4B. In the embodiment of FIGS. 1A to 1C and 2A, 2B either the entire shaft part 14 beneath the turned over rivet section, i.e. the rivet bead 42, form the centering section 40 or however only a part directly beneath the rivet bead 42, with it being possible for the remaining part to be stepped, i.e. provided with a smaller diameter for pre-centering.

Various possibilities exist for modifying the elements in accordance with FIGS. 1A to 1C and 3A to 3C. For example, the head part can have a functional section at the side opposite to the shaft part, for example in the form of an outer thread, an inner thread, a further shaft part with a clip mount or a guide part. As a further alternative the shaft part 14 could be made longer and either serve as a guide for a pin or a shaft or be provided with an internal thread.

Figure 1A:
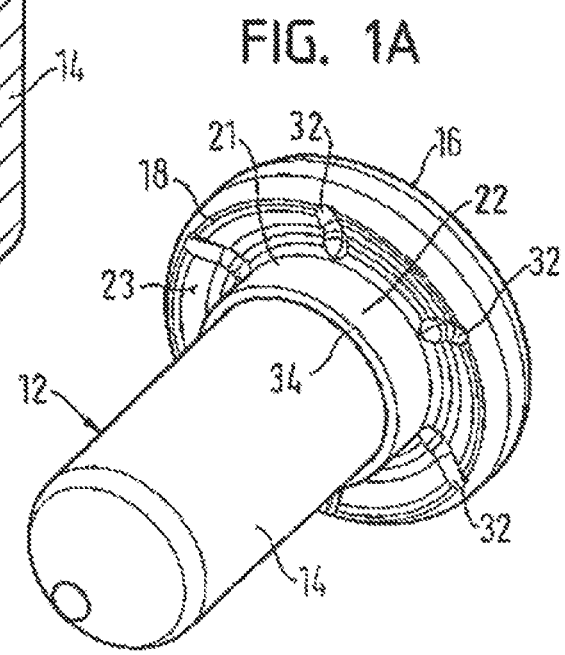

The method for the attachment of the element 12 of FIGS. 1A to 1C to a sheet metal part will now be described with reference to FIGS. 2A and 2B. It is pointed out that the same description also applies for the attachment of the element 12 in accordance with FIGS. 3A to 3C to a sheet metal part 10 in accordance with FIGS. 4A and 4B, which is brought to expression by the use of the same reference numerals. The description of the method in accordance with FIGS. 2A and 2B will thus not be repeated for the FIGS. 4A and 4B.

Figure 2A:
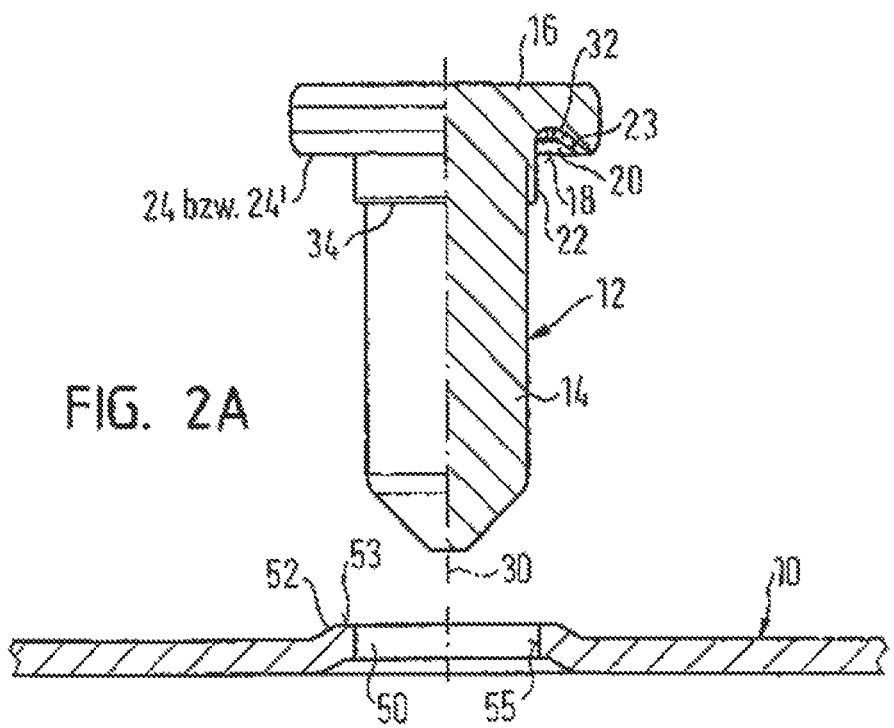
Figure 2B:
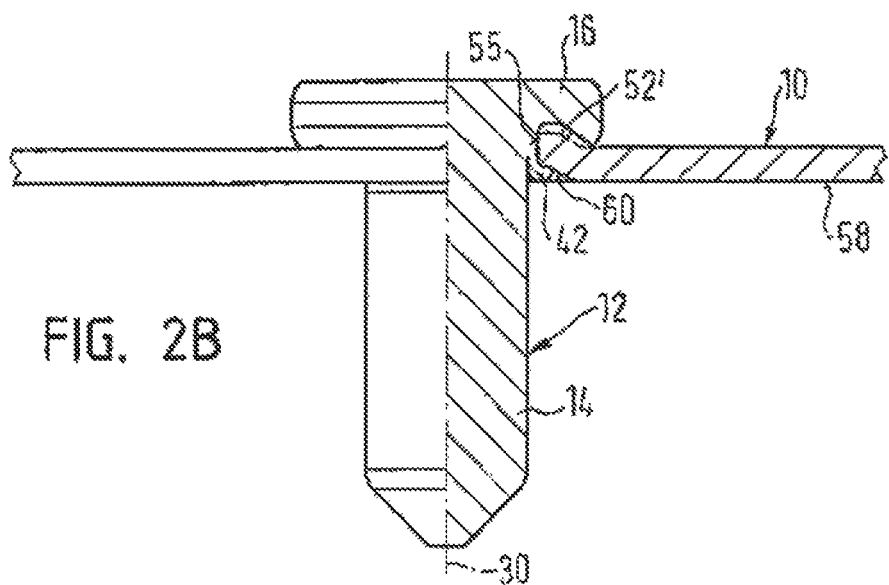
Figure 3C:
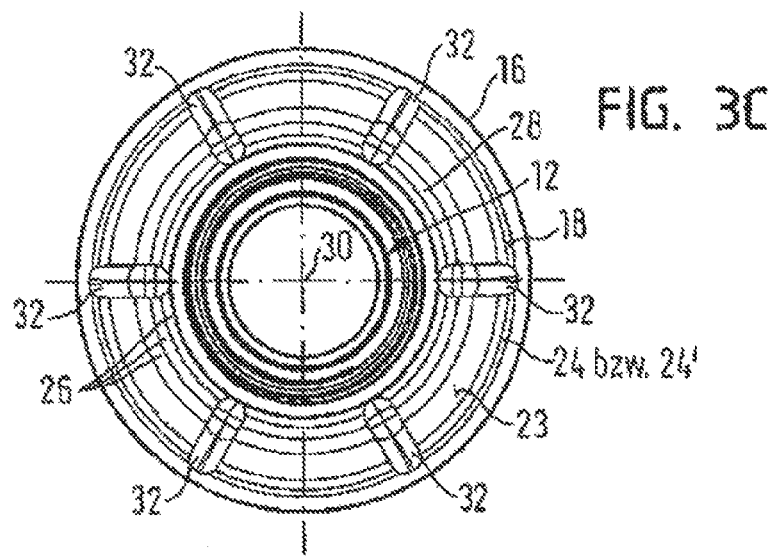
Figure 3B:
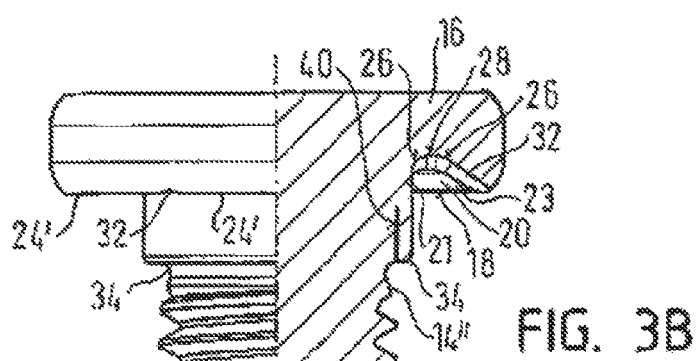
Figure 3A:
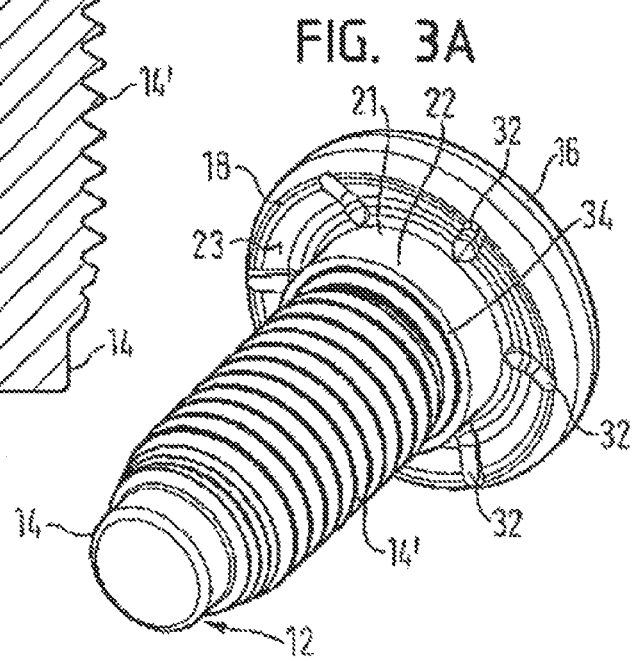

As shown in FIG. 2A (4A) the element 12 is inserted into a pre-holed sheet metal part 10 which has been pre-shaped to the region of the hole 50 to a raised portion 52 which is at least substantially matched to the shape of the ring recess 23. In this example the raised portion 52 of the sheet metal part is flattened off at the top 53 and the hole 50 has been subsequently pierced, whereby the side wall 53 of the hole extends parallel to the longitudinal axis 30. The pre-given flattening is however not essential and the conical raised portion 52 could be straightforwardly formed without a flattened portion 53. The stamping of the hole 50 could also be simultaneously combined with the pressing process for the formation of the hole 50, whereby the hole 50 would extend conically and would diverge upwardly in FIG. 2A. As a further alternative the raised portion can have a steeper conical shape than the conical wall 24 of the ring recess 23.

The attachment of the element to a sheet metal part takes place in a manner known per se with the means of a die button in a press or C-frame. In this arrangement pressure is for example exerted onto the head part of the element while the sheet metal part is supported on the die button. By means of the die button (not shown), which has a central section or a central bore which receives the shaft part and a ring-like raised portion surrounding the section or the bore, the sheet metal material around the rivet section 22 is formed into the or each local recess 32. The rivet section 22 is laid during the formation of the rivet bead 42 into the ring recess 54 formed in the lower side of the sheet metal part 10.

For this purpose the ring-like raised portion of the die button is preferably formed at its free 30 end with a ring edge which merges into a rounded shaping surface disposed radially outside of the ring edge. The diameter of the ring edge is selected to be somewhat smaller than the diameter of the ring apex at the free end of the rivet section 22, whereby the rivet section 22 is deflected radially outwardly during the riveting process by the ring edge and the rounded shaping surface and formed into a rivet bead 42. In this connection the sheet metal material is so crushed by the forces exerted between the head part 16 of the element and the die button, by the rivet bead that is forming and by the region of the die button radially outside of the rivet bead, that the sheet metal material flows into the local recess(es) 32 and there forms raised portions in the sheet metal material which form a toothed interlock between the element and the sheet metal part 10 providing security against rotation. Through the beading over of the rivet section the sheet metal material is moreover clamped into a radial groove 56 formed between the ring recess 20 and the rivet bead 42, which secures the element in the axial direction in the sheet metal part. The sheet metal material is moreover firmly pressed against the shaft part 14 of the element in the region above the rivet bead 42 by the crushing forces (and the simultaneously occurring dilation of the rivet section) whereby a high hole friction arises which produces a firm positioning of the element and an increased resistance to rotation.

Moreover, the sheet metal material is placed in compression so that in dynamic operation no fatigue cracks are to be feared. This effect can be increased further when the conical raised portion of the sheet metal is partly pressed flat, i.e. when the clamping or riveting process is used in accordance with the initially named EP-A-0 539 793.

The result of the method is thus a component assembly comprising the sheet metal part 10 and the element 12 attached thereto, with the sheet metal part 10 having a ring-like raised portion 52' in the region of the ring recess 20 which is received in form-fitted manner into the ring recess 20, with the material of the sheet metal part being disposed in the or in each local recess 32. Furthermore, a ring recess 60 is present at the side 58 of the sheet metal part 10 remote from the ring recess 20 with the rivet section which has been beaded over into the rivet bead 42 being located in the ring recess 60. The side of the rivet bead 42 remote from the head part 16 projects at least substantially not beyond the side 58 of the sheet metal part in the region around the rivet bead and is preferably set back slightly relative to the latter, for example by 0.02 mm.

Figure 5:
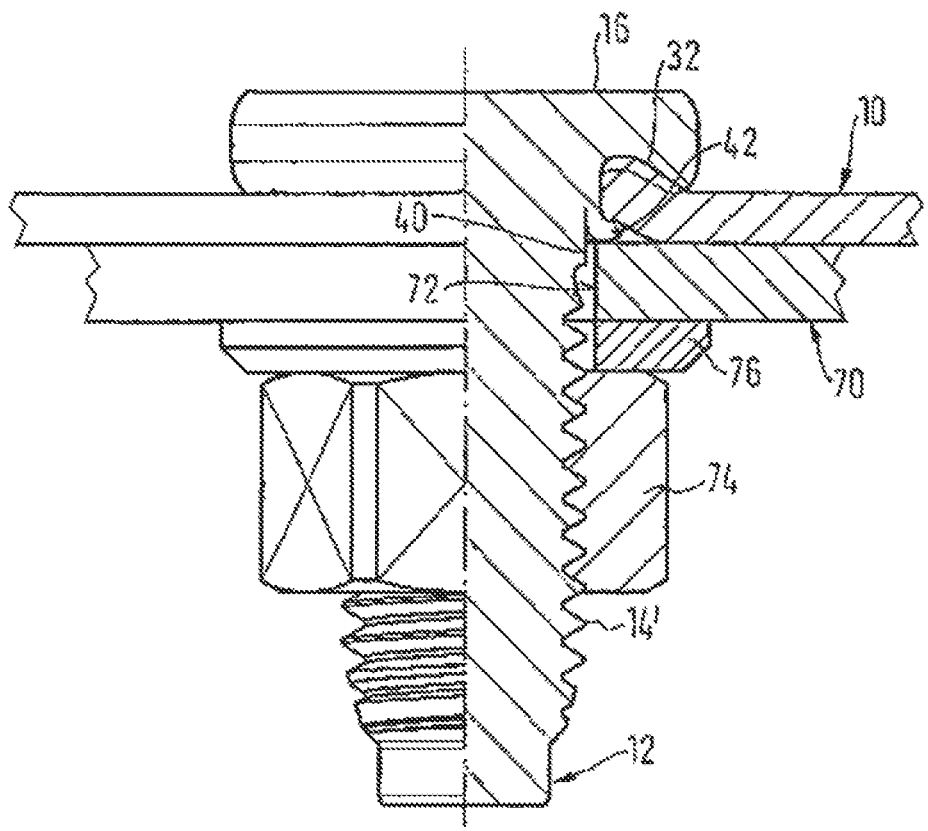
FIG. 5 shows the screw-on situation in which a component is attached to the component assembly which is shown in FIG. 4B, FIGS. 6A-C show three views of a further embodiment of an element in accordance with the invention, with FIG. 6A showing the element in a perspective illustration at the underside of the head part, FIG. 6B being an illustration of the element in FIG. 6A sectioned partly in longitudinal direction, and FIG. 6C showing a plan view of the underside of the head part of the element in accordance with FIGS. 6A and 6B, and FIG. 7A-D show further embodiments of elements attached to a component.

A use of the component assembly of FIG. 4B with a further component 70 is shown in FIG. 5. The component has a hole 72.

The inner diameter of the hole 72 is at least substantially identical to the outer diameter of the shaft part 14 in the region of the rivet bead 42, i.e. of the centering section 40, and the component is centered by this region of the shaft part.

The component 70 is held against the sheet metal part 10 by means of a fastener element 74 attached to the shaft part 14 of the element, for example, on forming the shaft part with an external thread 14', by a nut 74 screwed onto the thread 14', optionally the intermediary of a washer 76. As an alternative to this the shaft part can be formed as a tubular part with an internal thread (not shown) and the component 70 can then be secured by a screw screwed into the internal thread.

For the sake of completeness it should be pointed out that the elements in accordance with the invention need not necessarily satisfy the centering function, but rather it could have a pure fastening function and need therefore not necessarily be a centering element or centering bolt.

In all embodiments all materials can be named as an example for a material of the element which achieve the strength values of class 8 in accordance with the ISO standard or higher in the context of cold deformation, for example a 35B2 alloy. The so formed fastening elements are also suitable for all commercially available steel materials for drawing quality sheet metal parts as also for aluminum or its alloys. Also aluminum alloys, in particular those with higher strength can be used for the elements, for example AlMg5. Also elements of higher strength magnesium alloys such as for example AM50 could be considered.

Referring to FIGS. 6A to 6C an element 12 is shown which can be attached to a sheet metal part 10 by riveting. The element 12 has the form of a centering element having a shaft part 14 and a head part 16, with the head part having an at least approximately ring-like recess 20 at its side 18 remote from the sheet metal part 10 with the ring recess merging at the radially inner side into a cylindrical section 21 of the head part 16 which in turn merges into the shaft part 14 and a tubular rivet section 22 which surrounds the shaft part 14 in the region of the head part 16, i.e. directly beneath the head part 16. The ring recess 20 is arranged within a ring-like contact surface 24 disposed radially outside of the ring recess, or radially outside of a contact surface consisting of circular ring segments 24', and merges at the radially outer side via an at least approximately conical wall 23 into the contact surface 24 or 24'. In the embodiment of FIGS. 6A-6C, the shaft part 14 is formed as a tubular centering part 78.

Figure 7A:
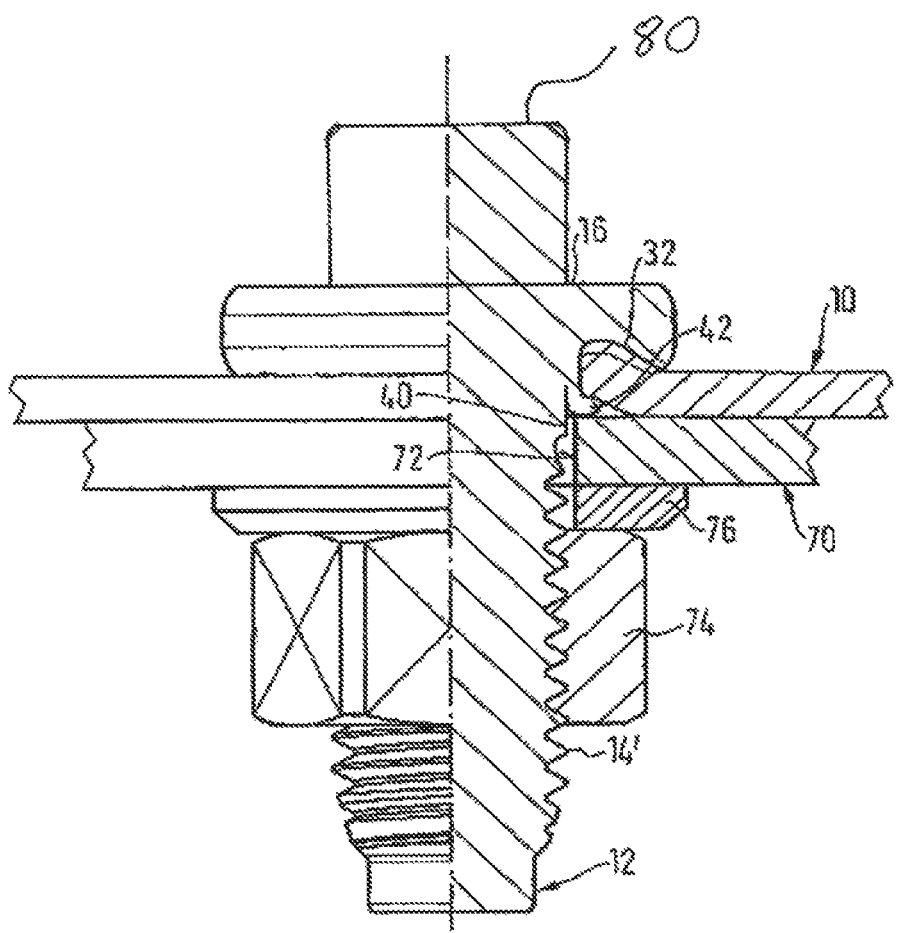
Figure 7D:
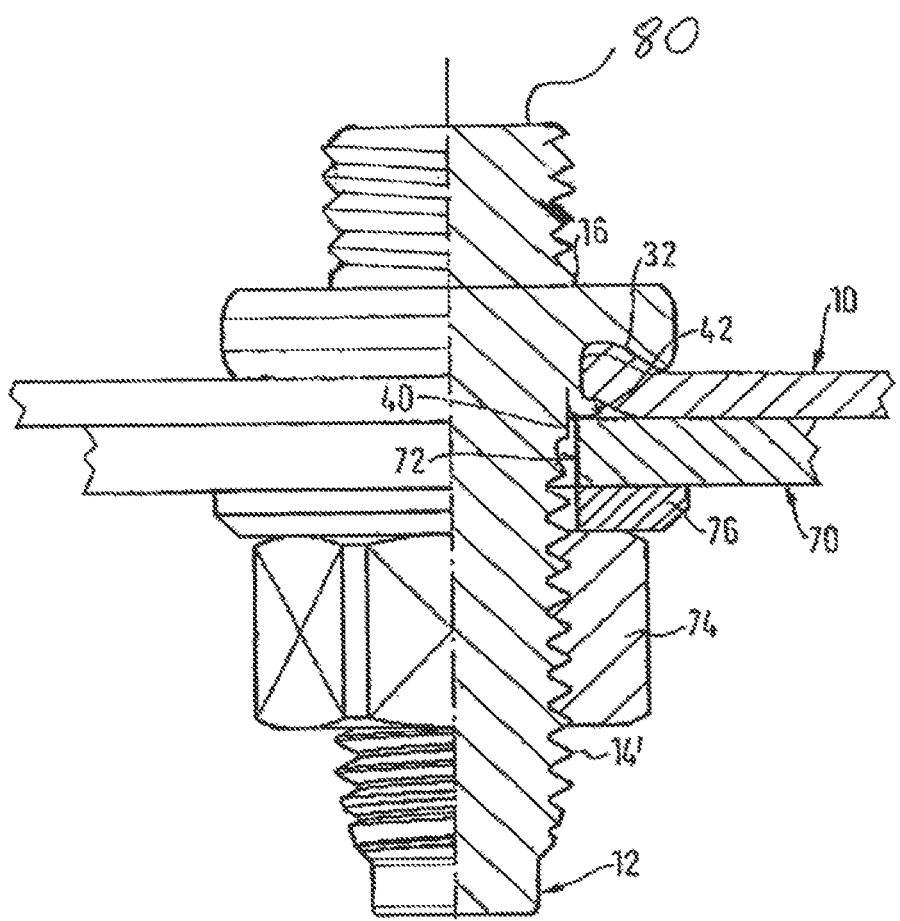

Turning to FIGS. 7A to 7D, which show the use of component assemblies with further components 70 as is shown e.g. in FIG. 5. However, in the embodiments of FIGS. 7A to 7D the element 12 is provided with a functional section 80 at the side of the head part 16 opposite to the shaft part 14. FIG. 7A shows a functional section 80 which can be used as a guide, but can equally be used as a centering part. FIG. 7B shows a functional section 80 including a clip mount. FIG. 7C shows a functional section 80 including an inner thread. FIG. 7D shows a functional section 80 including an outer thread.

The invention claimed is:

1. A component assembly comprising a sheet metal part (10) and a centering element (12) attached to it by a riveted connection, said element having a shaft part (14), a tubular rivet section (22) surrounding said shaft part and a head part (16), said head part having a cylinder section (21), a side (18) confronting said sheet metal part, a recess (20) at least approximately in the shape of a ring, said side and an annular sheet metal contact surface (24, 24') surrounding said recess, said recess merging at a radially inner side into said cylinder section (21) of said head part (16) and said cylinder section (21) in turn merging into said shaft part (14) and said cylinder section also merging into said tubular rivet section (22) which surrounds said shaft part (14) in a region of said head part (16) and being disposed within said annular contact surface (24, 24') and said recess merging at a radially outer side via an at least approximately conical wall (23) into said annular contact surface, there being a plurality of local recesses (32) provided in at least one of said conical wall (23) of said recess and in a base surface (26) of the ring recess wherein a region of said shaft part (14) forms a centering section (40) radially within said tubular rivet section (22) adjacent said cylinder section (21), said sheet metal part (10) having a raised formation (52) received in said annular recess (20); material of said sheet metal part being disposed in the or in each local recess (32) and said sheet metal part (10) having, at a side (58) remote from the annular recess (20), a ring recess (60) into which the rivet section (22) which has been turned over into a rivet bead (42) is disposed, with the side of the rivet bead remote from the head part (16) at least substantially not projecting beyond a side (58) of the sheet metal part in the region around the rivet bead (42).

2. A component assembly in accordance with claim 1, said rivet bead (42) being disposed, with the side of the rivet bead remote from the head part (16) being set back slightly relative to a side (58) of the sheet metal part in the region around the rivet bead (42).

3. A component assembly in accordance with claim 1, said component (70) having a hole (72) which is disposed over said shaft part (14) of the element (12) and contacts said sheet metal part (10), an inner diameter of said hole (72) being at least substantially identical to an outer diameter of said shaft part in a region of said centering section (40), i.e. of said rivet bead (42) and said component being centered by this region of said shaft part.

4. A component assembly in accordance with claim 1 there being a further component (70) held at said sheet metal part (10) by means of a fastener element (74) attached to said shaft part (14) of said element.

5. A component assembly in accordance with claim 4, said shaft part having an external thread and said further component being secured by a nut screwed onto said thread.

6. A component assembly in accordance with claim 4, said shaft part being formed as a tubular part with an internal thread and said further component being secured by a screw screwed into said internal thread.

* * * * *